(12) United States Patent
Tinskey et al.

(10) Patent No.: US 6,704,622 B2
(45) Date of Patent: Mar. 9, 2004

(54) VEHICLE STABILITY CONTROL

(75) Inventors: Michael R. Tinskey, Commerce Township, MI (US); Hualin Tan, Canton, MI (US); Yohannes G. Haile, Belleville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/040,668

(22) Filed: Dec. 28, 2001

(65) Prior Publication Data

US 2003/0125847 A1 Jul. 3, 2003

(51) Int. Cl.[7] .............................................. G06F 19/00
(52) U.S. Cl. ............................... 701/1; 701/70; 701/73; 701/41; 180/197; 180/446
(58) Field of Search ............................... 701/1, 75, 72, 701/70; 318/430; 303/150, 146, 147; 180/197, 446

(56) References Cited

U.S. PATENT DOCUMENTS

| | | | |
|---|---|---|---|
| 5,388,658 A | 2/1995 | Ando et al. ................. 430/598 |
| 5,667,286 A * | 9/1997 | Hoying et al. .............. 303/140 |
| 5,746,486 A | 5/1998 | Paul et al. .................. 303/146 |
| 5,749,062 A | 5/1998 | Yamamoto et al. ........... 701/72 |
| 5,774,819 A | 6/1998 | Yamamoto et al. ........... 701/41 |
| 5,973,463 A | 10/1999 | Okuda et al. ................ 318/430 |
| 6,035,251 A | 3/2000 | Hac et al. ....................... 701/70 |
| 6,053,583 A | 4/2000 | Izumi et al. ................. 303/150 |
| 6,226,587 B1 * | 5/2001 | Tachihata et al. ............. 701/72 |
| 6,263,261 B1 | 7/2001 | Brown et al. ................... 701/1 |
| 6,272,418 B1 | 8/2001 | Shinmura et al. ............. 701/72 |
| 6,401,850 B1 * | 6/2002 | Bowen ....................... 180/65.6 |
| 6,466,857 B1 * | 10/2002 | Belvo .......................... 701/82 |

FOREIGN PATENT DOCUMENTS

| | | |
|---|---|---|
| GB | 2323940 A | 10/1998 |
| GB | 2372020 A | 8/2002 |
| JP | 010210604 A | 8/1998 |
| JP | 011059362 A | 3/1999 |

* cited by examiner

Primary Examiner—Marthe Y. Marc-Coleman
(74) Attorney, Agent, or Firm—Brinks Hofer Gilson & Lione

(57) ABSTRACT

Stability is an important factor in vehicle safety. Yaw rate error can be used to improve stability. Yaw rate is measured through a yaw rate sensor. Desired yaw rate can be determined from vehicle conditions and driver input. The yaw rate error is calculated by subtracting the measured yaw rate from the desired yaw rate. Based on this calculation, yaw torque target signals can be calculated to apply torque to the wheels through the application of one or more electric drivelines. The application of torque can provide side-to-side and front-to-rear torque biasing to improve stability. Furthermore, the application of torque at specific times can improve braking and launch capabilities.

19 Claims, 4 Drawing Sheets

VEHICLE STABILITY CONTROL

FIELD OF THE INVENTION

The present invention relates to control systems for vehicles. In particular, the present invention relates to a stability control system for an automotive vehicle.

BACKGROUND OF THE INVENTION

Stability has always been a factor in designing a safer automobile. Stability is necessary to prevent skidding of an automobile or other vehicle in poor traction, during turning, acceleration, and deceleration. Prior art devices have attempted to control several parameters when attempting to improve traction, including controlling speed, acceleration, and torque. Another such way to control stability involves measuring yaw. Yaw is the angular turning around a vertical axis located in the center of the vehicle. In these inventions, a measured yaw is compared to a calculated desired yaw. The difference between the two yaws is a yaw rate error. In prior implementations, this calculation has been used to apply braking, adjust steering, or to adjust torque to counter skidding.

These prior art systems were typically expensive, requiring several separate sensors to control the vehicle. Furthermore, while the prior art systems improved stability, they did not improve launch performance of the vehicle. The launch performance is the ability of the vehicle to obtain and maintain traction during initial acceleration. Therefore, prior implementations did not satisfy the need for an inexpensive, modular stability control system which improved launch capabilities.

BRIEF SUMMARY OF THE INVENTION

The invention provides an improved system to control vehicle stability through the use of yaw rate error and the method for using the system. The system provides improved handling through front-to-rear torque biasing, side-to-side torque biasing, and braking intervention. Furthermore, the application of this system increases mobility, precision, and launch capabilities. Finally, the invention provides a system that improves stability, agility, and precision by utilizing a low cost, modular design.

An embodiment of the invention includes at least one sensor. This sensor detects the yaw rate of the vehicle and translates that yaw rate into a signal. The embodiment also includes a controller that is in electric communication with the sensor and receives the yaw rate from the sensor. The controller compares the measured yaw rate with a calculated, desired yaw rate and creates a yaw torque target signal for achieving the desired yaw rate. This yaw torque target signal is then sent to at least one electric driveline, that adjusts torque in response to the yaw torque target signal.

In another aspect of the invention, an embodiment of a method of controlling vehicle stability is provided. The method measures the yaw rate of a vehicle and converts it into a signal. This signal is sent to a controller which determines the conditions of the vehicle, receives driver input, and determines a desired yaw rate from this information. The controller then compares the desired yaw rate to the measured yaw rate and calculates a yaw torque target signal that is sent to independently controlled electric drivelines. The electric drivelines then apply torque according to the yaw torque target signal.

Other systems, methods, features, and advantages of the invention will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF SEVERAL VIEWS OF THE DRAWINGS

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PRESENTLY PREFERRED EMBODIMENTS

Figure 1:
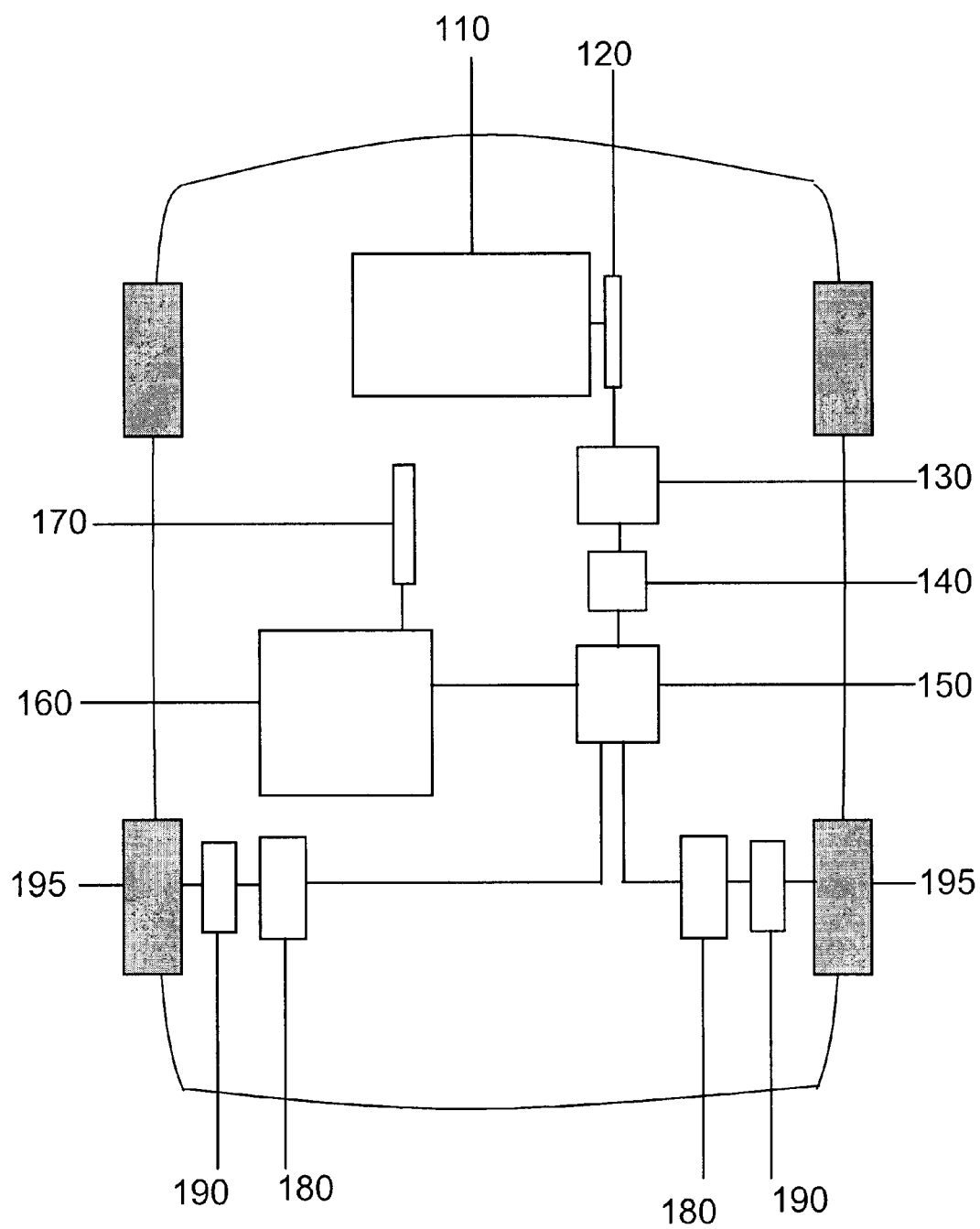
FIG. 1 is a plan view of a vehicle using a vehicle stability control system which controls the drivelines for the two rear wheels of the vehicle according to this invention.

FIG. 1 depicts an overhead schematic view of a vehicle utilizing vehicle stability control utilizing manipulation of yaw rate in accordance with the present invention. The yaw rate is manipulated by using two rear independently controlled electric drivelines. In FIG. 1, a vehicle 100 with an internal combustion engine 110 is disclosed. This engine 110 is operatively connected to an alternator 120, which charges a battery 130. The battery 130 supplies direct current electricity to a yaw rate sensor 140, which is in communication with a controller 150. In the present embodiment, the battery 130 is a twelve-volt vehicle battery. The controller 150 can be a microprocessor, microcomputer, or the like. The yaw sensor 140 measures the yaw of the vehicle. Yaw is defined herein as the angular motion of the vehicle around the vertical axis of the vehicle at the center of gravity. The controller 150 then follows the logic disclosed in FIG. 3. The controller 150 governs two electric drivelines which provide torque to the two rear wheels 195. An electrical storage device 160 supplies electricity to these drivelines. In the current embodiment, the storage device 160 operates at twenty-four volts. This electric storage device can also be the battery of the vehicle. The distribution of electricity from the electric storage device 160 to the drivelines is determined by the controller 150. An auxiliary alternator 170 supplies the storage device with direct current electricity. The electric drivelines contain electric motors 180 and gearboxes 190 that apply torque to the rear wheels 195 when the driveline receives the appropriate yaw torque target signal from the controller 150. This embodiment can also be applied to a front-wheel drive vehicle by applying torque through the electric drivelines of the front wheels as opposed to the rear wheels, as is obvious to one skilled in the art. Torque can be applied to an individual wheel, which creates a side-to-side torque bias. Torque can also be applied to both wheels simultaneously, which creates front-to-back torque biasing. Furthermore, the system has the ability to apply resistive torque independently to each driveline during braking to improve stability. The drivelines can also be independently operated in reverse to improve mobility and precision. Furthermore, the torque at the wheels can be supplemented to improve launch performance by improving traction during acceleration.

Figure 2:
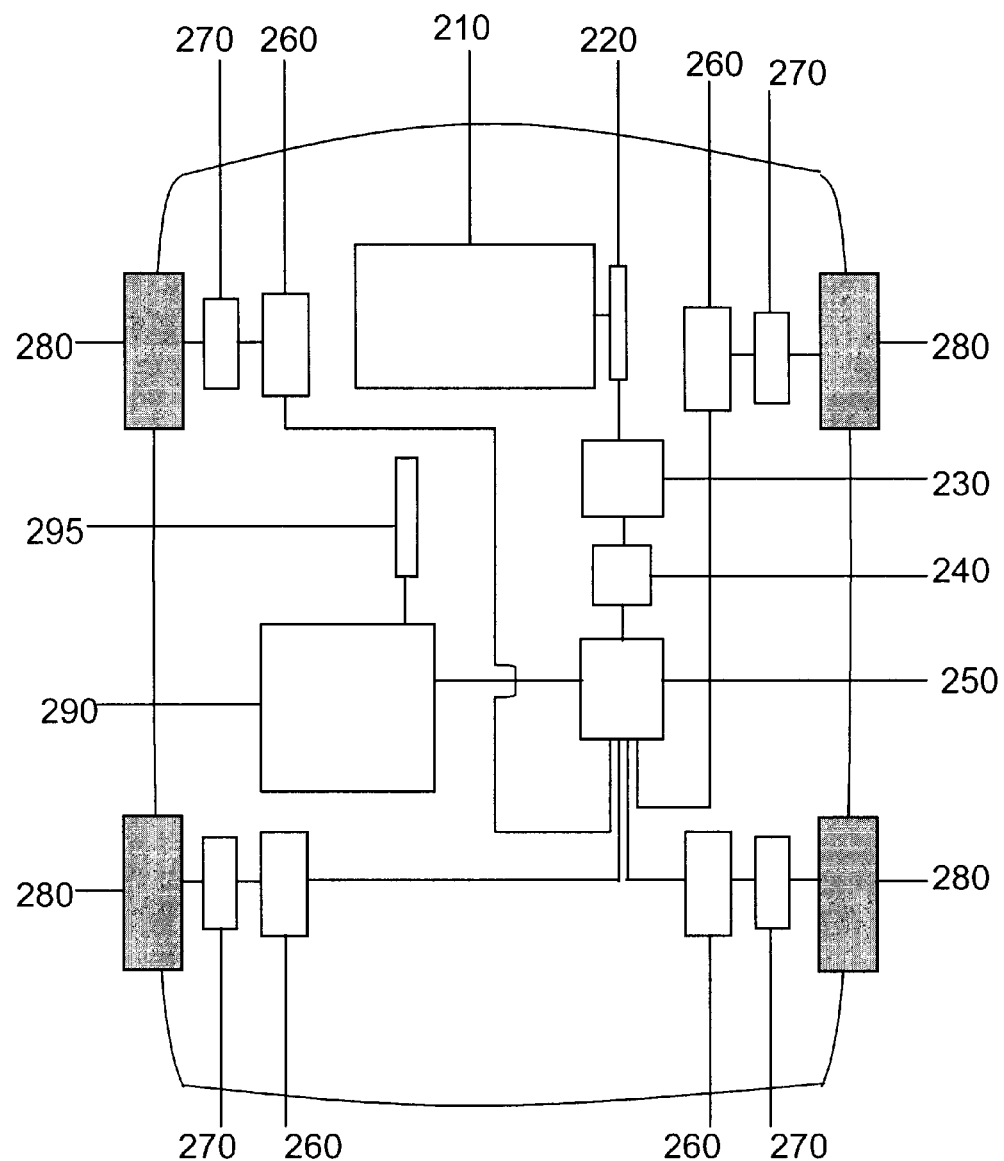
FIG. 2 is a plan view of a vehicle using a vehicle stability control system which controls the drivelines for the two front wheels and the two rear wheels of the vehicle according to the invention.

FIG. 2 depicts an overhead schematic view of a vehicle utilizing vehicle stability control by manipulating yaw rate. The yaw rate is governed by using the independently controlled electric drivelines of all four wheels. FIG. 2 discloses an all-wheel-drive vehicle with an internal combustion engine 210. An alternator 220 is operatively connected to the engine 210. The alternator 220 charges the main battery of the vehicle 230. The battery 230 supplies an electrical current to the components of the vehicle including a yaw sensor 240, which is in electrical communication with a controller 250. The yaw sensor 240 measures the yaw rate of the vehicle 200. The yaw sensor is preferably positioned near the center of gravity of the vehicle. The controller 250 can be a microprocessor, a microcomputer, or the like. In the present embodiment, the controller 250 is in communication with the electric drivelines leading to the four wheels 280 following the logic disclosed in FIG. 3. The electric drivelines preferably include both an electric motor 260 and a gearbox 270. The electric motors 260 are powered by an electric storage unit 290. An auxiliary alternator 295 provides electricity to the electric storage unit 290. This storage unit 290 preferably operates at a higher voltage than a standard vehicle battery. The purpose of the higher voltage is to provide more power to the electric motors 260 in the driveline. The distribution of electricity from the electric storage unit 290 to the drivelines is governed by the controller 250. The electric motors 260 can be activated by the controller to apply and distribute individual torque to each driveline. The ability to apply torques of varying magnitudes and direction to all four wheels 280 allows for increased biasing. Torque can be applied to two wheels on the same side of the vehicle to have increased side-to-side torque biasing. Furthermore, torque can be applied to the two wheels on one side, while torque in the opposite direction can be applied to the wheels on the other side of the vehicle, providing even more bias. Finally, by applying torque to all four wheels in the same direction, braking and launch capabilities can be improved.

Figure 3:
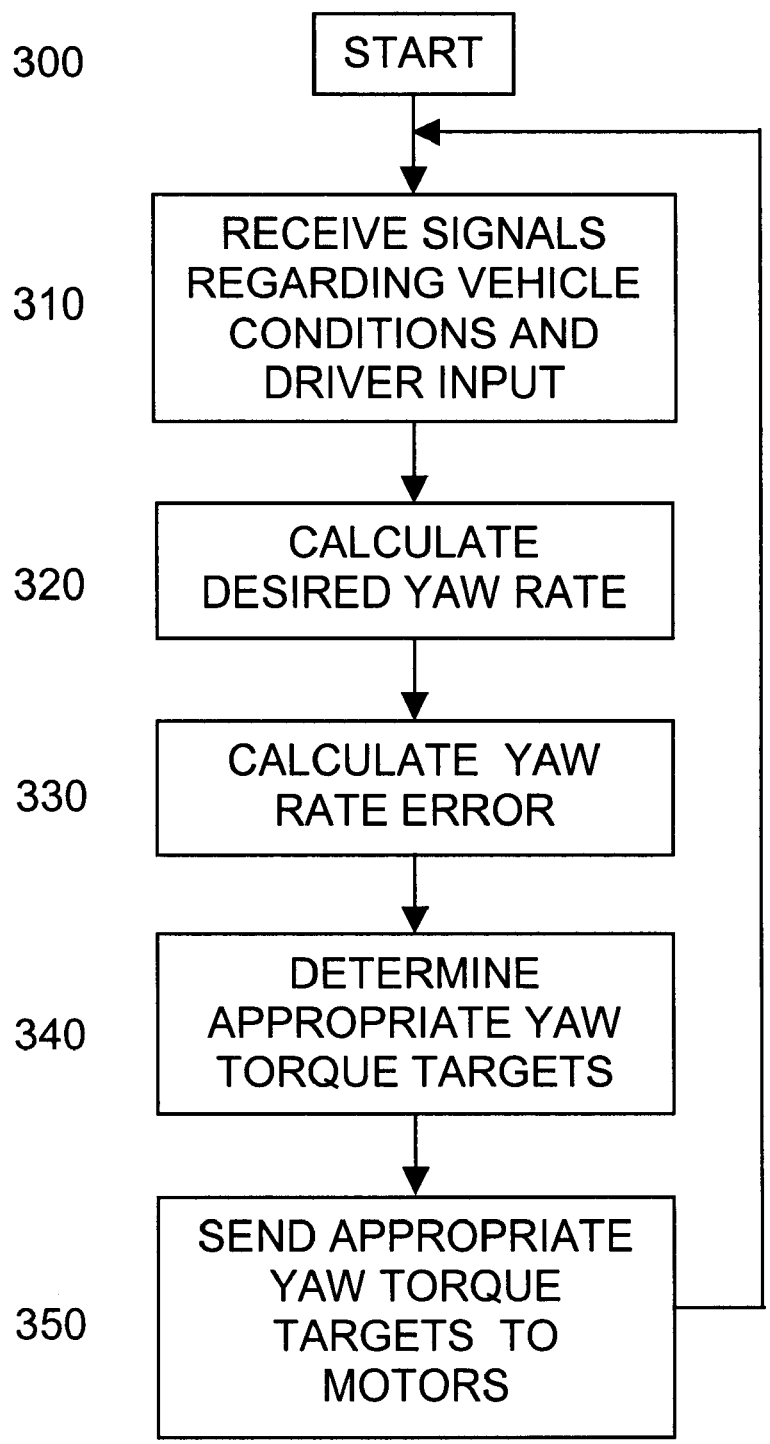
FIG. 3 illustrates a command flow diagram of the control functions according to this invention.

FIG. 3 represents the methodology used by the controller to obtain the yaw torque target signals. The controller 150 (FIG. 1), 250 (FIG. 2) receives signals from vehicle sensors and determines the vehicle conditions as well as the driver inputs 310. The vehicle conditions are the actual movements of the vehicle. The driver inputs are the commands the driver of the vehicle creates, from such inputs as an accelerometer pedal, a brake pedal, or the steering wheel. The controller then calculates a desired yaw rate 320 from the drive inputs and vehicle conditions. The controller uses a bicycle model to obtain the desired yaw rate. The bicycle model is a well-known model for the lateral and yaw dynamics of a vehicle. The general equations for the bicycle model are:

$$M(\dot{v}_y + v_x \dot{\gamma}) = F_{yf} + F_{yr}$$

$$I_z \ddot{\gamma} = L_f F_{yf} - L_r F_{yr}$$

where M is vehicle mass $v_y$ and $v_x$ are velocities, $\gamma$ is yaw rate, $F_{yf}$ and $F_{yr}$ are forces. Furthermore, $I_z$ is the inertia of the vehicle, and $L_f$ and $L_r$ are the distances from the center of the front and rear axles to the center of gravity. These equations are derived to obtain a direct relationship between desired yaw rate and steering wheel input. This relationship is:

$$\gamma_{des} = \frac{a_{11}b_2 - a_{21}b_1}{a_{11}a_{22} - a_{12}a_{21}} \delta$$

In this equation, $\delta$ represents the driver steering input and $a_{11}$, $a_{21}$, $a_{22}$, $a_{12}$, $b_1$, and $b_2$ are calculated from known, measured quantities. The controller then calculates yaw rate error by subtracting the measured yaw rate from the desired yaw rate 330. From this calculation, the controller 150 (FIG. 1), 250 (FIG. 2) determines the appropriate yaw torque target signal for each motor in each individual driveline 340. The objective of the controller 150 (FIG. 1), 250 (FIG. 2) in creating the appropriate yaw torque target signal is to achieve the desired yaw rate. The yaw torque target signal is the appropriate tractive and braking torque magnitude and direction. The controller 150 (FIG. 1), 250 (FIG. 2) determines a electric motor voltage to be applied to the motors 180 (FIG. 1), 260 (FIG. 2) to obtain the yaw torque target. The controller 150 (FIG. 1), 250 (FIG. 2) then sends the yaw torque target signal to the motor in the driveline, which then has the information necessary to adjust the torque magnitude and direction to minimize the yaw rate error 350.

Figure 4:
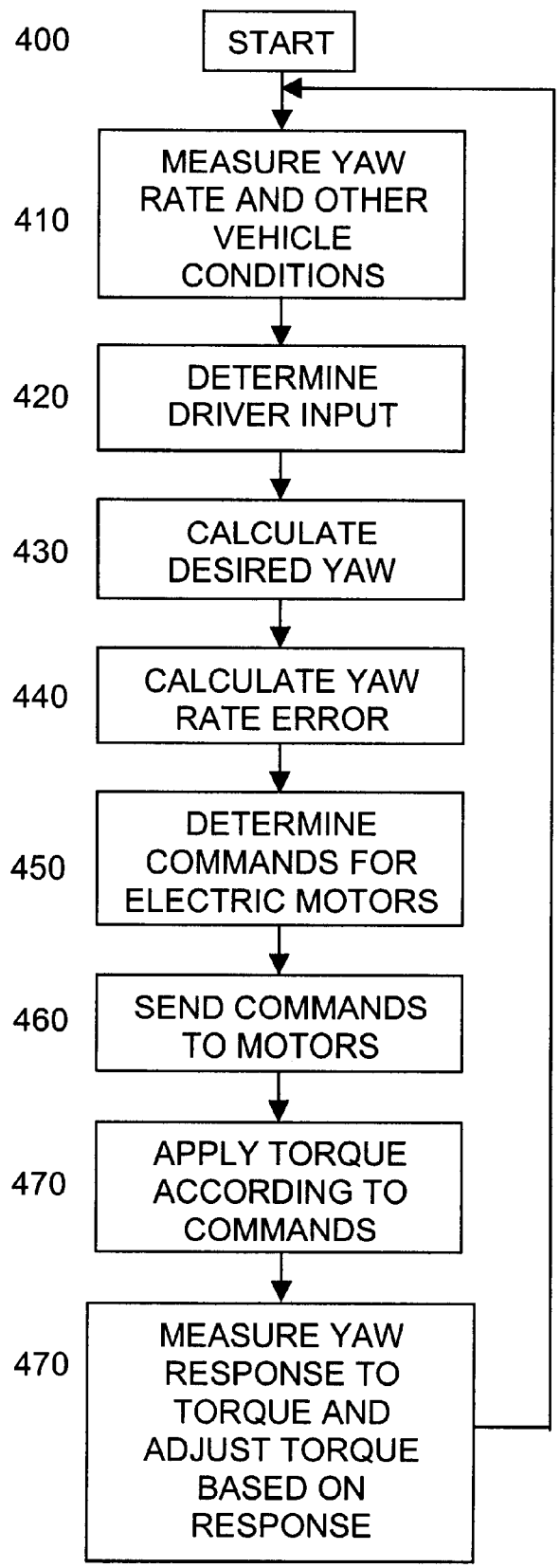
FIG. 4 illustrates a flow diagram of the method of controlling vehicle stability according to the invention.

FIG. 4 represents another embodiment of the invention. This embodiment includes a method of using yaw rate to control vehicle stability through the use of electric drivelines. In FIG. 4, the system begins with no information regarding yaw 400. Yaw is then measured and other conditions are read, including wheel speeds, accelerations, and steering angle 410, as well as driver inputs 420. From this information, the desired yaw rate is calculated 430. The desired yaw rate is typically calculated using the bicycle model and the equations described above. Then, the yaw rate error is determined 440. The yaw rate error is the difference between the measured yaw rate and the desired yaw rate. From this parameter, yaw torque target signals are determined for each individual electric motor in each driveline 450. The yaw torque target signals are then sent to the motors 460. The direction and control of the torque is corrected to adjust the measured yaw rate to the desired yaw rate and reduce the yaw rate error 470. The method can further measure the response of the yaw to the application of torque and adjust this torque to avoid understeering, oversteering, or lateral acceleration 480.

Various embodiments of the invention have been described and illustrated. The description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A stability control system for an automotive vehicle comprising:
   at least one sensor means for detecting a parameter of yaw rate and translating said parameter into a yaw rate signal;
   a controller means in electrical communication with said at least one sensor means for determining a desired yaw rate, comparing said yaw rate signal with said desired yaw rate, and creating at least one yaw torque target signal for achieving said desired yaw rate correcting stability; and
   at least one electric driveline in electrical communication with said controller means for receiving said at least one yaw torque target signal independently and making a corrective action with the at least one electric driveline based on said at least one yaw torque target signal.

2. The stability control system of claim 1 wherein the at least one driveline further comprises at least one electrical motor receiving an electric supply from at least one electric storage unit.

3. The stability control system of claim 1, wherein said controller means uses a two degree of freedom model for describing lateral and yaw motion.

4. The stability control system of claim 1, wherein the at least one driveline in electrical communication with said controller means further comprises a first electric driveline operatively connected to a first rear wheel and a second electric driveline operatively connected to a second rear wheel.

5. The stability control system of claim 1, wherein the at least one driveline in electric communication with said controller means further comprises a first electric driveline operatively connected to a first front wheel and a second electric driveline operatively connected to a second front wheel.

6. The stability control system of claim 1, wherein the at least one driveline further comprises a driveline for each wheel of the vehicle.

7. A stability control system for an automotive vehicle comprising:

at least one sensor means for detecting a parameter of yaw rate and translating said parameter said parameter into a yaw rate signal;

a controller means in electrical communication with said at least one sensor means for determining a desired yaw rate, comparing said yaw rate signal with said desired yaw rate, and creating at least one yaw torque target signal for achieving said desired yaw rate and correcting stability, wherein said controller means creates at least one torque target signal by determining a tractive or braking torque magnitude and a tractive/braking torque direction for said at least one driveline and determining an appropriate electric motor voltage to be applied to said at least one electric motor;

at least one electric driveline in electrical communication with said controller means for receiving said at least one yaw torque target signal and making a corrective action based on said at least one yaw torque target signal.

8. The stability control system of claim 7, wherein said corrective action is an application of said appropriate electric voltage to said at least one electrical motor.

9. The stability control system of claim 7, wherein the at least one driveline further comprises at least one electrical motor receiving an electric supply for at least one electrical storage unit.

10. The stability control system of claim 7, wherein said controller means uses a two-degree of freedom model for describing lateral and yaw motion.

11. The stability control system of claim 7, wherein the at least one driveline in electrical communication with said controller means further comprises a first electric driveline operatively connected to a first rear wheel and a second electric driveline operatively connected to a second rear wheel.

12. The stability control of claim 7, wherein the at least one driveline in electric communication with said controller means further comprises a first electric driveline operatively connected to a first front wheel and a second electric driveline operatively connected to a second front wheel.

13. The stability control system of claim 7, wherein the at least one driveline further comprises a driveline for each wheel of the vehicle.

14. A method for controlling the stability of a vehicle having at least one independently controlled electric driveline comprising:

measuring a yaw rate if said vehicle and converting said yaw rate into a yaw signal;

send said yaw signal to a controller;

determining a desired yaw rate;

comparing said yaw rate to said desired yaw rate by said controller;

calculating at least one yaw torque target signal by said controller from said yaw rate and said desired yaw rate;

sending said at least one yaw torque target signal from said controller to said at least one independently controlled electric driveline independently; and applying at least one torque to at least one wheel based on said at least one yaw torque target signal.

15. The method of claim 14, wherein said desired yaw rate is calculated by said controller using a two degree of freedom model for describing later and yaw motion.

16. The method of claim 14, further comprising:

measuring a response of the yaw to an application of said at least one torque; and adjusting said at least one torque to avoid understeering, oversteering, or lateral acceleration.

17. A method for controlling the stability of a vehicle having at least one independently controlled electric driveline comprising:

measuring a yaw rate of said vehicle and converting said yaw rate into a yaw signal;

sending said yaw signal to a controller;

determining a desired yaw rate;

comparing said yaw signal to said desired yaw rate by said controller;

calculating at least one yaw torque target signal by said controller from said yaw rate signal and said desired yaw rate, wherein said at least one torque target signal further comprises a tractive or braking torque magnitude and a tractive braking or torque direction;

sending said at least one yaw torque target signal from said controller to said at least one independently controlled electric driveline; and applying at least one torque to at least one wheel based on said at least one yaw torque target signal.

18. The method of claim 17, wherein said desired yaw rate is calculated by said controller using a two-degree of freedom model for describing lateral and yaw motion.

19. The method of claim 17, further comprising:

measuring a response of the yaw to an application of said at least one torque; and adjusting said at least one torque to avoid understeering, oversteering, or lateral acceleration.

* * * * *